(12) United States Patent
Smith

(10) Patent No.: US 6,317,169 B1
(45) Date of Patent: Nov. 13, 2001

(54) MECHANICALLY OSCILLATED PROJECTION DISPLAY

(75) Inventor: Ronald D. Smith, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/301,237

(22) Filed: Apr. 28, 1999

(51) Int. Cl.[7] .................................................. H04N 5/64
(52) U.S. Cl. ........................ 348/744; 348/756; 348/764; 348/771
(58) Field of Search ................................. 348/744, 750, 348/756, 783, 764, 782, 202, 72

(56) References Cited

U.S. PATENT DOCUMENTS

| | | | |
|---|---|---|---|
| 4,035,068 | 7/1977 | Rawson | 353/122 |
| 4,155,630 | 5/1979 | Ih | 350/188 |
| 4,386,372 | * 5/1983 | Slater | 348/782 |
| 4,918,535 | * 4/1990 | Grabis et al. | 348/782 |
| 5,381,258 | * 1/1995 | Bordignon et al. | 348/202 |
| 5,402,184 | * 3/1995 | O'Grady et al. | 348/764 |
| 5,475,420 | * 12/1995 | Buchin | 348/72 |
| 5,614,961 | * 3/1997 | Gibeau et al. | 348/750 |
| 5,621,529 | 4/1997 | Gordon et al. | 356/376 |

FOREIGN PATENT DOCUMENTS

| | | |
|---|---|---|
| 0 635 986 A1 | 1/1995 | (EP) . |
| WO 97/02507 | 1/1997 | (WO) . |
| WO 97/14076 | 4/1997 | (WO) . |
| WO 99/60443 | 11/1999 | (WO) . |

* cited by examiner

Primary Examiner—Reinhard J. Eisenzopf
Assistant Examiner—Trang U. Tran
(74) Attorney, Agent, or Firm—Trop, Pruner & Hu, P.C.

(57) ABSTRACT

A projection display system may be mechanically perturbed to remove or reduce speckle. In addition, pixellation effects may also be removed or reduced. By mechanically disturbing a portion of the system, for example using a wobble perturbation, the speckle effects may be temporally smeared so that they become invisible to the user. In one embodiment of the present invention, a folding mirror may be mechanically perturbed, using a plurality of piezoelectric actuators, at frequencies in the ultrasonic range.

23 Claims, 3 Drawing Sheets

MECHANICALLY OSCILLATED PROJECTION DISPLAY

BACKGROUND

This invention relates generally to projection displays including displays using laser and non-laser illumination sources.

Projection displays are subject to so called speckle artifacts under certain circumstances. Speckle is a random spatial interference pattern where the plane wave interferes with itself to modulate its intensity. Speckle may appear like very fine particles sprinkled over a display. The effect is generally static and if the observer and the display are stationary, the effect is visible.

Speckle is largely identified as a problem with coherent light sources, such as lasers. However, incandescent light sources with high gain optics can also produce speckle effects due to optical magnification which produces partial coherence of the light source.

Removing the speckle from a coherent light source is not believed to be possible. Speckle may be avoided in incoherent light sources by avoiding the kind of high gain optics which cause partial coherence.

Speckle effects are dealt with in consumer compact disk (CD) players or CD-ROMs which use solid state laser light sources. Since speckle interferes with reproduction of digital data the current source driving the solid state laser is modulated at very high frequency. This has the effect of spreading out the frequency of light by modulation. While this does not technically eliminate speckle, it does move the speckle around at a high enough frequency to make it invisible to the data detector. This technique does not work with incandescent light sources because one cannot modulate the output light at a sufficiently high frequency.

Projection displays may also suffer from a defect called pixellation. Pixellation is where the "squares" that make up the pixels that form the image become visible. Lines appearing on displays subject to pixellation show jagged effects which appear blocky with additional edges.

Thus, there is a continuing need for improved ways to deal with speckle and pixellation in projection displays.

SUMMARY

In accordance with one aspect, a projection display includes a projection source and optics associated with the projection source. A device is adapted to mechanically oscillate at least a portion of said display.

DETAILED DESCRIPTION

Figure 1:
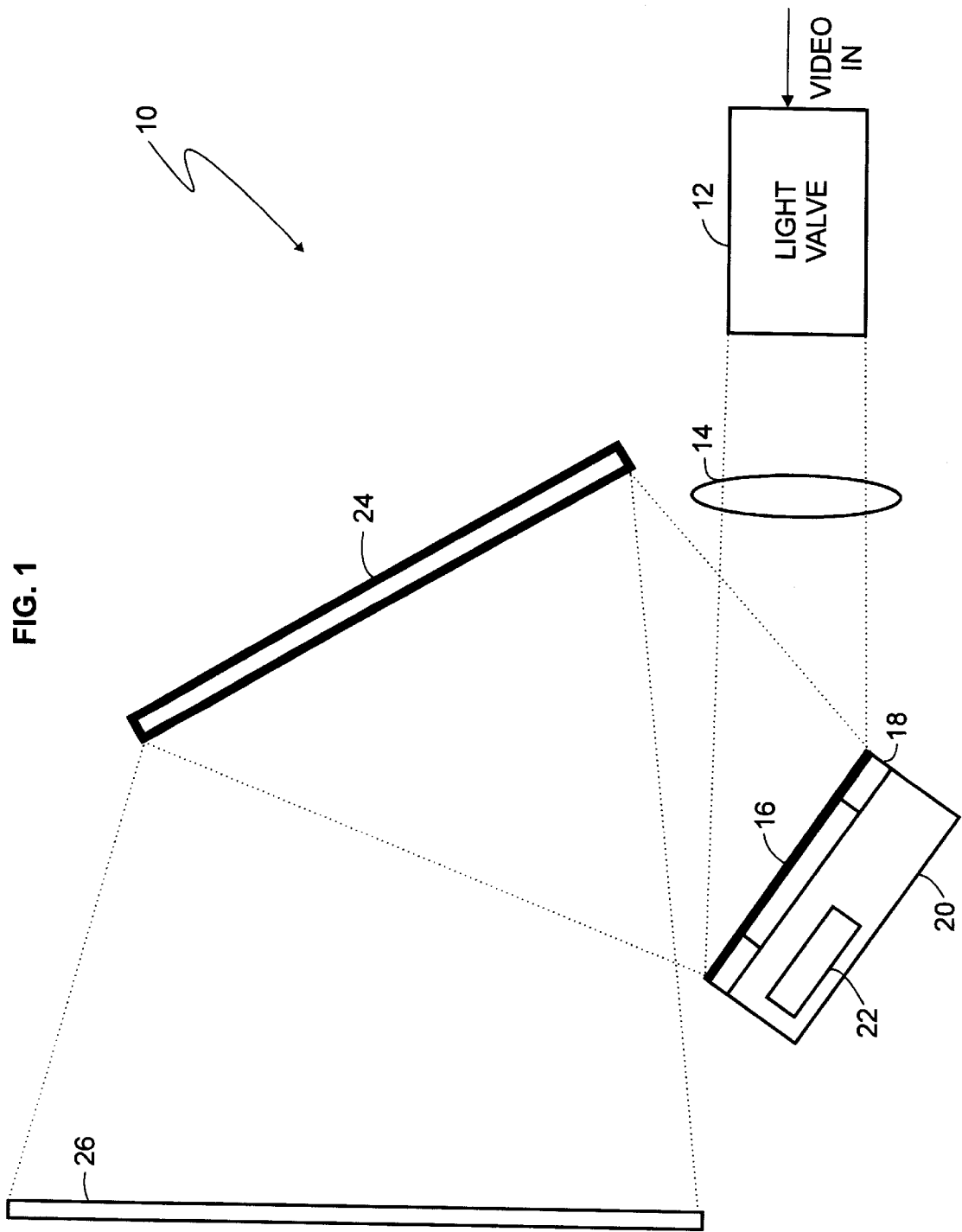
FIG. 1 is a schematic depiction of one embodiment of the present invention.

A projection display 10, shown in FIG. 1, includes a light valve 12 coupled to receive a video input signal, in one embodiment of the present invention. The light valve 12 produces modulated output light which is projected by a projection lens 14. The projection optics may also include a folding mirror 16 and a projection mirror 24 which reflect the output light onto a projection screen 26.

One or more components of the projection display may be mechanically oscillated to overcome speckle and/or pixellation. By perturbing at least a portion of the display, a smearing effect may be achieved which moves the speckle on the display at a sufficiently high frequency that it is not visible by the user. Similarly, the same perturbation may smear the borders between pixels and remove or reduce pixellation.

In one embodiment, the folding mirror 16 is oscillated since it is of relatively lower mass and therefore is more readily oscillated. The mirror 16 may be attached to piezoelectric actuators 18 at each of its corners. These actuators oscillate the mirror at a desired frequency in response to an appropriate drive signal. Advantageously, the oscillation is at relatively high frequency to remove speckle and/or pixellation. Ultrasonic frequencies (i.e. those about 20,000 Hertz) are advantageous because they do not create sounds that are detectable by humans.

Figure 2:
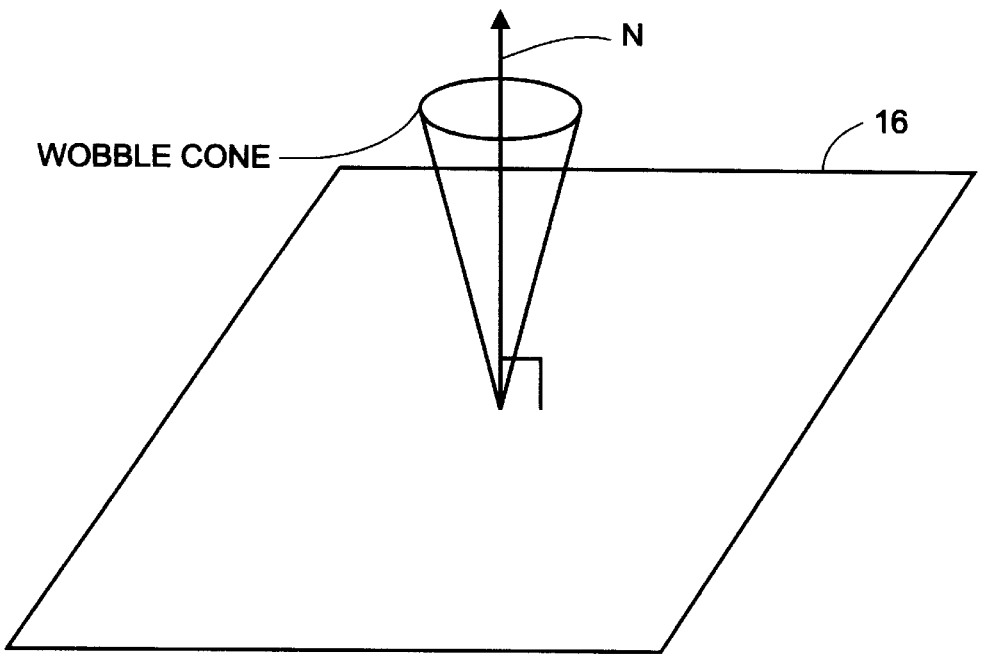
FIG. 2 is a diagram showing the characteristics of the drive circuit utilized in one embodiment of the present invention.

In one embodiment, a display portion may be driven at an amplitude of the angular tilt that is very small. Thus, a relatively limited range of movement is adequate. By driving the actuators 18 in a phase shifted sequence, the display portion, such as the mirror 16, "wobbles" about a surface normal to the mirror 16, for example in a circular, sinusoidal fashion, as shown in FIG. 2. A normal to the surface of the mirror 16 is indicated at "N" and the path that the normal follows under perturbation is indicated by the cone labeled "wobble cone" in FIG. 2.

More and less complex oscillations may be used as well. For example, reciprocating, planar or linear oscillations may be effective in dealing with speckle. However, reciprocation may not totally remove pixellation, which is usually two dimensional. Two dimensional oscillations, occurring entirely within a plane, may also be effective. In addition, oscillations that are more complex than the recurrent sinusoidal motion described above may be advantageous in some cases. For example, random perturbations may be applied to the corners to produce more erratic and less repetitive motion, in some embodiments. In addition, oval or elliptical sinusoidal movement may also be used.

Figure 3:
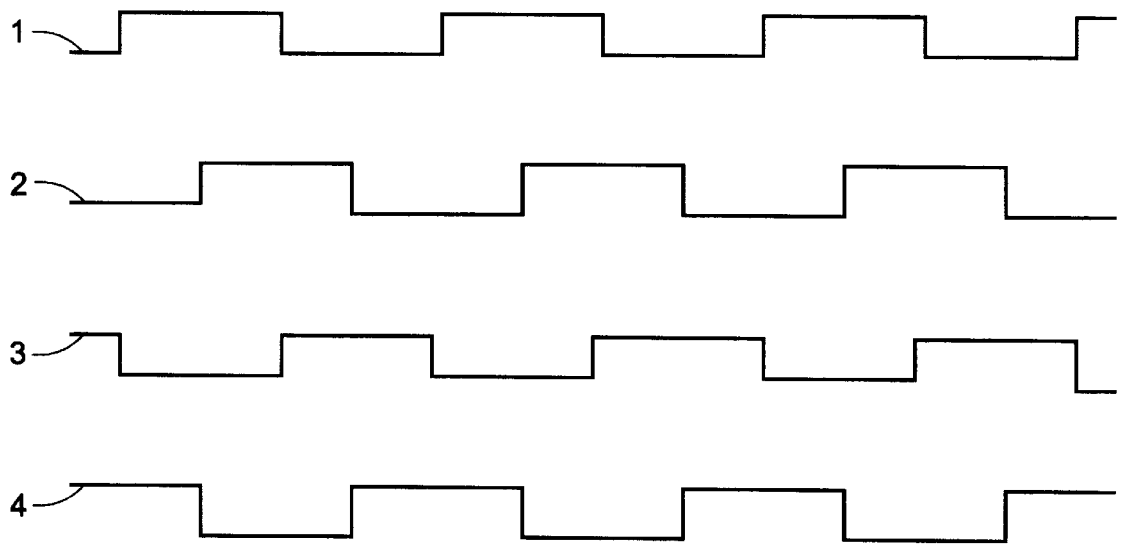
FIG. 3 is a timing diagram for the drive circuits used in the embodiment shown in FIG. 1.

Referring to FIG. 3, the drive signals 1–4 from the drive electronics 22 (FIG. 1) are each applied to a different one of the actuators 18. In one embodiment of the present invention, the drive signals may be phase shifted to create a circular wobble as illustrated in FIG. 2. While the waveforms are represented in the illustrated embodiment by digital signals, they can also be other waveforms including analog waveforms. Generally, the natural mechanical response time of the perturbed portion of the display may filter the resulting movement.

With respect to pixellation, the amplitude of the oscillation has an the effect on the extent to which the pixellation is reduced. Namely, wobbling the display made up of a pixels tends to smear out the actual pixel edges and smooth over the pixellation effect. Adjacent pixels may form a continuous line and artifacts of the pixel boundaries may be undetectable in some embodiments. In such case, the lines are only visible at transitions of illumination.

Figure 4:
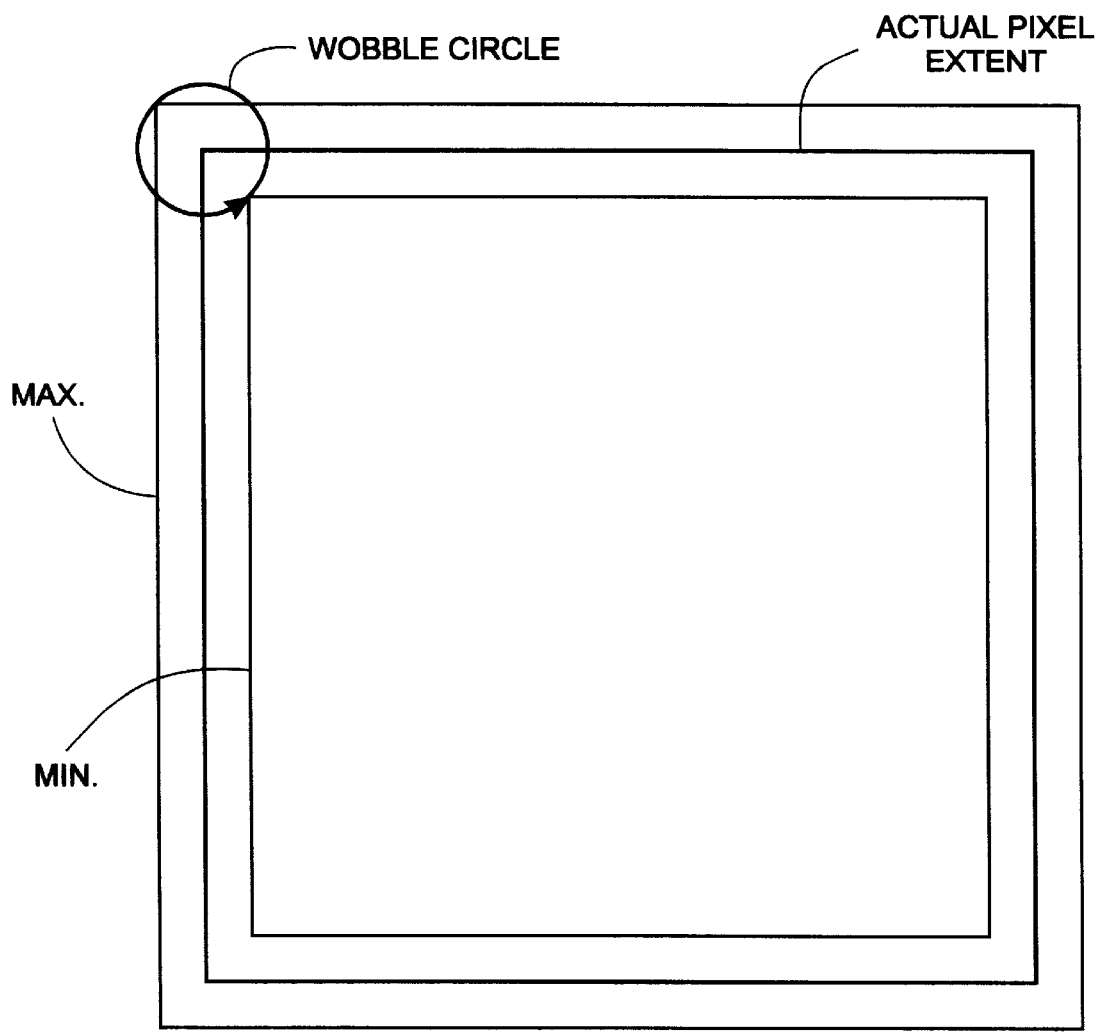
FIG. 4 is a depiction of the pixel boundaries under display perturbation.

As indicated in FIG. 4, the minimum apparent pixel boundary "min" is less than the actual pixel boundary "actual pixel extent" when the system is perturbed to an extent indicated by the indicated "wobble circle". The maximum apparent pixel boundary "max" is greater than the actual pixel extent. The displacement between the actual pixel extent and the maximum and minimum apparent pixel boundaries is determined by the amplitude of the perturbation. In this way, the pixel boundaries are moved about so that they are smeared, becoming less evident.

Simple drive functions may cause dark spots (from the "erasure" of the speckle") to form circles or arcs as the spots move about in a smooth regular fashion and as the interference patterns are created and destroyed. Visible artifacts may appear as faintly colored circles and arcs in the image. By providing some degree of randomness in the drive function, the wobble may be made more complex. The longer the interval between repetitions of the exact same perturbation, the less likely the user is to notice any recurring erasing effect as described above.

Thus, while truly random perturbations may not be necessary, inducing a sufficiently long period before providing the exact same perturbation may sufficiently spread the erasing effect to make it less visible. However, if desired, a relatively random drive, such as that achieved with a chaotic attractor, may be utilized. Such a drive is described in *Scientific American*, August 1993, pp. 120–123, "Circuits That Get Chaos in Sync". In general, by changing the angle of the wobble surface (such as the cone) randomly, a relatively random perturbation may remove the artifacts without creating dark spots and faintly recognizable circles or arcs.

Of course, other drive functions may be utilized without departing from the principles of the present invention. That is, while circles are described, ovals or mixtures of ovals and rectilinear perturbations may be utilized in some embodiments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A projection display comprising:
   a projection light source;
   optics associated with said projection light source; and
   a device to mechanically oscillate at least a portion of said display in a wobble pattern.

2. The display of claim 1 wherein said projection source is a light valve using laser illumination.

3. The display of claim 1 wherein said projection light source is a light valve using non-laser illumination.

4. The display of claim 1 wherein said optics include a folding mirror and a projection mirror, said device coupled to said folding mirror.

5. The display of claim 1 wherein said device includes a piezoelectric actuator.

6. The display of claim 1 wherein said wobble pattern is non-planar.

7. The display of claim 6 wherein said wobble pattern is random.

8. The display of claim 1 wherein said device oscillates at least a portion of said display at a frequency sufficient to reduce speckle artifacts.

9. The display of claim 8 wherein said device oscillates at least a portion of said display at ultrasonic frequencies.

10. The display of claim 1 wherein said device is adapted to reduce pixellation.

11. The display of claim 10 wherein said device oscillates at least a portion of said display at a frequency sufficient to reduce speckle artifacts.

12. A method of projecting an image comprising:
    projecting an image on a surface using a projection display; and
    mechanically oscillating at least a portion of the projection display in a wobble pattern.

13. The method of claim 12 wherein oscillating includes oscillating in more than two dimensions.

14. The method of claim 12 wherein oscillating includes oscillating said display to reduce speckle.

15. The method of claim 14 wherein oscillating includes oscillating said display to reduce pixellation.

16. The method of claim 14 wherein oscillating includes oscillating said portion of said display at ultrasonic frequencies.

17. The method of claim 12 wherein oscillating includes oscillating said portion in a random pattern.

18. The method of claim 12 wherein oscillating includes oscillating said portion such that a normal to said portion describes a conical surface.

19. A projection display comprising:
    a projection source including a laser illumination source;
    optics associated with said projection source; and
    a device to mechanically oscillate at least a portion of said display, in a non-planar oscillation, at a frequency sufficient to reduce speckle.

20. The display of claim 19 wherein said device is adapted to oscillate said portion at an ultrasonic frequency.

21. The display of claim 19 wherein said device is also adapted to reduce pixellation.

22. The display of claim 19 wherein said device is adapted to cause an oscillation in at least two dimensions.

23. A method of projecting an image comprising:
    projecting an image on a surface using a projection display; and
    mechanically oscillating at least a portion of the projection display in a random pattern.

* * * * *

UNITED STATES PATENT AND TRADEMARK OFFICE
CERTIFICATE OF CORRECTION

PATENT NO.   : 6,317,169 B1
DATED        : November 13, 2001
INVENTOR(S)  : Ronald D. Smith It is certified that error appears in the above-identified patent and that said Letters Patent is hereby corrected as shown below:

Column 4,
Line 27, "14" should be -- 12 --.

Signed and Sealed this

Thirtieth Day of July, 2002

Attest:

JAMES E. ROGAN
Attesting Officer   Director of the United States Patent and Trademark Office